United States Patent
Schmidt et al.

(10) Patent No.: US 7,601,771 B2
(45) Date of Patent: Oct. 13, 2009

(54) POLYMER COMPOSITIONS CONTAINING POLYMERS AND IONIC LIQUIDS

(75) Inventors: Friedrich Georg Schmidt, Haltern am See (DE); Frank-Martin Petrat, Münster (DE); Andreas Pawlik, Recklinghausen (DE); Harald Häger, Freigericht (DE); Bernd Weyershausen, Essen (DE)

(73) Assignee: Goldschmidt GmbH, Essen (DE)

( * ) Notice: Subject to any disclaimer, the term of this patent is extended or adjusted under 35 U.S.C. 154(b) by 573 days.

(21) Appl. No.: 10/519,402

(22) PCT Filed: Jun. 13, 2003

(86) PCT No.: PCT/EP03/06245

§ 371 (c)(1),
(2), (4) Date: Sep. 9, 2005

(87) PCT Pub. No.: WO2004/005391

PCT Pub. Date: Jan. 15, 2004

(65) Prior Publication Data

US 2006/0100323 A1    May 11, 2006

(30) Foreign Application Priority Data

Jul. 5, 2002    (DE) ................. 102 30 572
Sep. 18, 2002  (DE) ................. 102 43 181

(51) Int. Cl.
C08K 5/34 (2006.01)
C08K 5/3435 (2006.01)
C08K 5/3492 (2006.01)
C08K 5/15 (2006.01)
C08K 5/42 (2006.01)
C08K 5/41 (2006.01)

(52) U.S. Cl. ............... 524/106; 524/95; 524/99; 524/100; 524/104; 524/105; 524/157; 524/167; 524/236

(58) Field of Classification Search ........ 524/106, 524/95, 99, 100, 104, 105, 157, 167, 236
See application file for complete search history.

(56) References Cited

U.S. PATENT DOCUMENTS

| | | | |
|---|---|---|---|
| 4,943,380 A | 7/1990 | Sugiura et al. |
| 5,313,987 A | 5/1994 | Röber et al. |
| 5,404,915 A | 4/1995 | Mügge et al. |
| 5,500,263 A | 3/1996 | Röber et al. |
| 5,512,342 A | 4/1996 | Röber et al. |
| 5,554,426 A | 9/1996 | Röber et al. |
| 5,798,048 A | 8/1998 | Ries |
| 5,858,492 A | 1/1999 | Röber et al. |
| 6,090,459 A | 7/2000 | Jadamus et al. |
| 6,161,879 A | 12/2000 | Ries et al. |
| 6,335,101 B1 | 1/2002 | Haeger et al. |
| 6,355,358 B1 | 3/2002 | Böer et al. |
| 6,391,982 B1 | 5/2002 | Haeger et al. |
| 6,407,182 B1 | 6/2002 | Maul et al. |
| 6,428,866 B1 | 8/2002 | Jadamus et al. |
| 6,451,395 B1 | 9/2002 | Ries et al. |
| 6,528,137 B2 | 3/2003 | Franosch et al. |
| 6,538,073 B1 | 3/2003 | Oenbrink et al. |
| 6,579,581 B2 | 6/2003 | Bartz et al. |
| 6,660,796 B2 | 12/2003 | Schueler et al. |
| 6,677,015 B2 | 1/2004 | Himmelmann et al. |
| 6,680,093 B1 | 1/2004 | Ries et al. |
| 6,726,999 B2 | 4/2004 | Schueler et al. |
| 6,766,091 B2 | 7/2004 | Beuth et al. |
| 6,783,821 B2 | 8/2004 | Ries et al. |
| 6,793,997 B2 | 9/2004 | Schmitz |
| 6,794,048 B2 | 9/2004 | Schmitz et al. |
| 7,025,842 B2 | 4/2006 | Monsheimer et al. |
| 2001/0018105 A1 | 8/2001 | Schmitz et al. |
| 2002/0132889 A1 | 9/2002 | Wit et al. |
| 2002/0142118 A1 | 10/2002 | Schmitz et al. |
| 2003/0072987 A1 | 4/2003 | Ries et al. |
| 2003/0124281 A1 | 7/2003 | Ries et al. |
| 2003/0212174 A1 | 11/2003 | Peirick et al. |
| 2004/0054041 A1 | 3/2004 | Schmidt |
| 2004/0140668 A1 | 7/2004 | Monsheimer et al. |
| 2004/0202908 A1 | 10/2004 | Schmitz et al. |
| 2004/0265527 A1 | 12/2004 | Schmitz et al. |
| 2006/0078752 A1 | 4/2006 | Schmitz et al. |

(Continued)

FOREIGN PATENT DOCUMENTS

EP    0 905 183    3/1999

(Continued)

OTHER PUBLICATIONS

Scott, Mark P. et al: "Application of ionic liquids as plasticizers for poly(methyl methacrylate)", Chemical Communications vol. 13, pp. 1370-1371, 2002.

(Continued)

*Primary Examiner*—Kriellion A Sanders
(74) *Attorney, Agent, or Firm*—Oblon, Spivak, McClelland, Maier & Neustadt, L.L.P.

(57) ABSTRACT

The invention relates to a polymer composition which comprises at least one at least semicrystalline polymer having no ionic groups and comprises at least one compound with plasticizing properties, and which comprises having 0.1 to 30% by weight of ionic liquid as plasticizer, and also to the use of this polymer composition, and a process for its preparation.

27 Claims, No Drawings

U.S. PATENT DOCUMENTS

| | | | |
|---|---|---|---|
| 2006/0083882 | A1 | 4/2006 | Schmitz et al. |
| 2006/0099478 | A1 | 5/2006 | Schmitz et al. |
| 2006/0100323 | A1 | 5/2006 | Schmidt et al. |
| 2006/0141188 | A1 | 6/2006 | Schmitz et al. |

FOREIGN PATENT DOCUMENTS

| | | |
|---|---|---|
| WO | 01/44363 | 6/2001 |

OTHER PUBLICATIONS

U.S. Appl. No. 11/685,283, filed Mar. 13, 2007, Dowe et al.
U.S. Appl. No. 11/816,595, filed Aug. 17, 2007, Haeger et al.
U.S. Appl. No. 11/816,588, filed Aug. 17, 2007, Haeger et al.
U.S. Appl. No. 11/816,556, filed Aug. 17, 2007, Wursche et al.
U.S. Appl. No. 11/813,103, filed Jun. 29, 2007, Baumann et al.
U.S. Appl. No. 08/609,612, filed Mar. 1, 1996, Jadamus et al.
U.S. Appl. No. 10/580,194, filed May 23, 2006, Kuhmann et al.
U.S. Appl. No. 10/588,487, filed Aug. 4, 2006, Schmitz et al.
U.S. Appl. No. 10/589,264, filed Aug. 14, 2006, Wursche et al.
U.S. Appl. No. 11/586,526, filed Oct. 26, 2006, Wursche et al.

POLYMER COMPOSITIONS CONTAINING POLYMERS AND IONIC LIQUIDS

The present invention relates to a polymer composition which comprises at least one at least semicrystalline polymer having no ionic groups and comprises at least one compound with plasticizing properties, and which comprises 0.1 to 30% by weight of ionic liquid as plasticizer, and also to the use of this polymer composition, and a process for its preparation.

Ionic liquids have been the subject of a variety of previous research projects for a number of years. An ionic liquid is generally understood to be a liquid composed exclusively of ions. Ionic liquids are liquid even at low temperatures (<100° C.) and have relatively low viscosity, whereas the long-used term molten salts applies to materials which usually have high melting points and are highly viscous and mostly highly corrosive. Although there are some examples of successful use of high-temperature molten salts as reaction media in preparative applications, the fact that ionic liquids are liquid even below 100° C. remains the essential point permitting their use as a replacement for conventional organic solvents in chemical processes. Although ionic liquids were known as early as 1914, it is only in the last 10 years that they have been intensively studied as solvent and/or catalyst in organic syntheses (review by K. R. Seddon in J. Chem. Technol. Biotechnol. 68 (1997), 351-356; T. Welton, in Chem. Rev. 99 (1999), 2071-2083; J. D. Holbrey, K. R. Seddon in Clean Products and Processes 1 (1999) 223-236; P. Wasserscheid, W. Keim in Angew Chem. 112 (2000), 3926-3945, and R. Sheldon in Chem. Comm. (2001), 2399-2407).

In ACS Symp. Ser. 737 (1999), 143-150, S. Fischer et al. report on melts of hydrates of inorganic salts, specifically $LiI.2H_2O$, $LiClO_4.3H_2O$, $NaSCN/KSCN/LiSCN.2H_2O$, and $LiClO_4.3H_2O/Mg(ClO_4)_2$, as solvents for cellulose.

Studies by J. S. Wilkes et al. (Electrochem. Soc. Proceed. (2000) Volume 99-41 (Molten Salts XII), 65) concerns polymer extraction processes, using chloroaluminate salts which are molten at room temperature. The ionic liquids used comprise 1-ethyl-2-methylimidazolium chloride/aluminum chloride mixtures, and various polymers were studied, including nylon, polyethylene, PVC and butyl rubber. WO 00/16902 and WO 00/20115 deal with specific ionic liquids which are used as catalyst or as solvents for catalysts in various organic syntheses.

Either for the use as a solvent for catalytic reactions or for other application sectors, it can be advantageous to immobilize the ionic liquid. The advantages of immobilization in catalytic syntheses are that it is easier to separate, obtain, and regenerate the catalyst, and that there is less product contamination.

Immobilized ionic liquids are disclosed by way of example in EP-A-0 553 009 and U.S. Pat. No. 5,693,585. Both references describe a calcined support with an ionic liquid and aluminum chloride and an alkylated ammonium chloride or imidazolinium chloride. The immobilized ionic liquids are used as catalysts in alkylation reactions.

WO-A-01/32308 describes ionic liquids immobilized on a functionalized support which supports or comprises a component of the ionic liquid, or supports or comprises a precursor of such a component. The ionic liquid may be immobilized by way of the anion, through treatment of a support with an anion source, before the ionic liquid is applied or formed. Another method of immobilizing the ionic liquid has the cation embedded into the support or bonded to the support by a covalent mechanism. The immobilized ionic liquids are used as catalysts, e.g. for the Friedel-Crafts reaction.

N. Ogata, K. Sanui, M. Rikukawa, S. Yamada, and M. Watanabe (Synthetic Metals 69 (1995), 521-524, and Mat. Res. Soc. Symp. Proc. 293, 135 et seq.) have also studied "immobilized" ionic liquids, and specifically using novel polymer electrolytes which are ion-conductive polymer complexes and are formed by dissolving various polycationic salts in ionic liquids (also referred to here as molten salts) comprising aluminum chloride. The polycationic salts may be polyammonium, polypyridinium, polysulfonium, and/or polyphosphonium salts. Further details of the study involved a polymer complex composed of a polypyridinium salt and of an ionic liquid comprising pyridinium salt and aluminum chloride. In this instance, the polypyridinium salt, rather than the pyridinium salt, is the ionic liquid and permits the polymer complexes to form thin layers, this being a result of the enormous rise in viscosity over the simple ionic liquid. The novel polymer complexes have high ion-conductivity and, like other polymer electrolytes, are of interest for applications in batteries and display devices.

U.S. Pat. No. 6,025,457 discloses polyelectrolytes of "molten-salt type" which comprise a polymer of molten-salt type obtained by reacting an imidazolium derivative bearing a substituent at the 1- and 3-position with at least one organic acid or one organic acid compound which contains an amide or imide bond. At least one component here, i.e. said imidazolium derivative or said organic acid compound, is a polymerizable monomer or a polymer. These polyelectrolytes, too, have high ion-conductivity at room temperature and good mechanical properties.

The prior art also describes many high-conductivity polymer electrolytes composed of a non-ionic polymer combined with an ionic liquid.

For example, in J. Electrochem. Soc. 144(4) (1997), L67-L70 J. Fuller et al. describe rubbery gel electrolytes made from poly(vinylidene fluoride-hexafluoropropyl)copolymers and ionic liquids based on 1-ethyl-3-methylimidazolium triflate or 1-ethyl-3-methylimidazolium tetrafluoroborate.

JP-A-10265673 discloses the preparation of solid polymer electrolytes in the form of ion-conductive films by polymerizing hydroxyethyl methacrylate and ethylene glycol dimethacrylate in the presence of an ionic liquid based on 1-butylpyridinium tetrafluoroborate.

JP-A-10265674 relates to compositions made from polymers, e.g. polyacrylonitrile and polyethylene oxide, and ionic liquids. The ionic liquids comprise, for example, $LiBF_4$ and 1-ethyl-3-methylimidazolium tetrafluoroborate. Uses given are solid electrolytes, antistats, and screening.

In Electrochim. Acta 45 (2000), 1265-1270, Noda et al. report that certain vinyl monomers can be polymerized in situ in molten salts made from 1-ethyl-3-methylimidazolium tetrafluoroborate or 1-butylpyridinium tetrafluoroborate, these being liquid at room temperature. The products are transparent, highly conductive, mechanically stable polymer electrolyte films.

Fuller et al. (Molten Salt Forum 5-6 (1998), 605-608) studied mixtures of ionic liquids or other imidazolium salts and poly(vinylidene fluoride-hexafluoropropyl)copolymers. These mixtures have high conductivity and thermal and dimensional stability for applications as high-conductivity polymer electrolytes in batteries, fuel cells, or capacitor units.

In Solid State Ionics 86-88 (1996), 353-356, Watanabe et al. disclose that liquid salt mixtures of trimethylammonium benzoate, lithium acetate, and lithium bis(trifluoromethylsulfonyl)imide are compatible with polyacrylonitrile and polyvinyl butyral at temperatures below 100° C., and give systems from which film-forming polymer electrolytes can be prepared.

Humphrey et al. (Book of Abstracts, 215th ACS National Meeting, Dallas, Mar. 29-Apr. 2, (1998), CHED-332, ACS, Washington D.C.) describe the solution and extraction of polymers using molten salts made from aluminum chloride and an organic chloride salt, these molten salts being liquid at room temperature. The ionic liquids have adjustable Lewis acidity, and give superacids on addition of hydrogen chloride.

In Chem. Commun. (2002), 1370-1371, PMMA is prepared by free-radical polymerization in an ionic liquid. However, the preparation of plasticized polymers via polymerization in ionic liquids is not appropriate for all types of polymer.

Many polymers, e.g. polyaramides, polyesters, polyamides, polyether(ether)ketones, are difficult to process or can be processed only with the aid of particular methods. Thermoplastic processing of these polymer materials as they stand is sometimes impossible without breakdown of the polymer chain. In many instances, polymers can be processed only with admixture of plasticizers. Many of the known plasticizers are unsuitable for high-temperature use. The reason for this may be either excessive volatility of the plasticizers or else incompatibility with the polymer. Especially in the case of polymers which contain polar groups, as is the case with polyamides or polyesters, for example, it is often impossible to find suitable non-corrosive plasticizers which do not release gases during processing.

An object of the present invention was therefore to provide a polymer composition which comprises a plasticizer which improves the properties of at least semicrystalline polymers containing no ionic groups, and which is non-volatile, or only slightly volatile, in particular at the processing temperatures commonly used for thermoplastics in the prior art.

Surprisingly, it has been found that addition of ionic liquids can improve the processability, preferably the thermoplastic processability, the electrical properties, and the compatibility with other systems, of polymers which contain no ionic groups. Although the use of ionic liquids as catalyst or for the preparation of polymer electrolytes has long been known from the literature, it was not previously known that the presence of ionic liquids in polymers which contain no ionic groups improves thermoplastic processability, so that it is possible to use ionic liquids as plasticizers. This manner of achieving the object is rendered still more surprising by the fact that the ionic liquids can also be used as solvents of these polymers, which are insoluble or only insufficiently soluble in organic or aqueous solvents, and that plasticized polymer compositions can thus be obtained.

The present invention therefore provides a polymer composition composed of at least one at least semicrystalline polymer having no ionic groups and of at least one compound with plasticizing properties, where the polymer composition comprises from 0.1 to 30% by weight of ionic liquid as plasticizer.

The invention also provides a process for the preparation of a polymer composition which comprises at least one polymer having no ionic groups and comprises at least one compound with plasticizing properties, where the polymer composition comprises from 0.1 to 30% by weight of ionic liquid as plasticizer.

The invention further provides the use of a polymer composition as above described, and also the use of a polymer composition prepared by the process of the invention.

An advantage of the polymer composition of the invention is that the solvent-like character of the ionic liquid increases the flowability of the melts of this polymer composition, the particular advantage being the non-volatility of the ionic liquid, even at the processing temperatures for the polymer blends. This means that it is possible either to use processing temperatures at which the plasticizers or processing aids used hitherto begin to exhibit excessive vapor pressure and cause evolution of gases and/or formation of deposits on the mold or die, or to use the plasticizing action to process the polymers at lower temperatures. This is particularly advantageous for semicrystalline or crystalline polymers, because the morphology of these usually gives them relatively high melting points, with the associated relatively high processing temperatures (when compared with an amorphous polymer, e.g. PMMA). The use of non-volatile plasticizers for semicrystalline or crystalline polymers permits these polymers to be used or processed at relatively high temperatures. The use of the ionic liquids as plasticizers increases the flowability of the molten polymer materials. The non-volatile and ionic character of the ionic liquids, and their particular solvent properties, permit their use as plasticizers or solvents, in particular for polymers or substances which are insoluble or insufficiently soluble in organic or aqueous solvents. The ionic liquid can likewise be used as plasticizer which lowers glass transition temperature when using crosslinked or crosslinking polymers in a mixture of materials.

The polymer composition of the invention, which comprises at least one at least semicrystalline polymer having no ionic groups and comprises at least one compound with plasticizing properties, comprises from 0.1 to 30% by weight, preferably from 0.5 to 25% by weight, and particularly preferably from 1 to 16% by weight, of ionic liquid as plasticizer. When polyamide is the thermoplastically processable polymer for which the ionic liquid is used as plasticizer, the concentration of the ionic liquid is preferably from 1 to 25% by weight, with preference from 3 to 16% by weight.

The ionic liquid preferably comprises a salt having a cation of the following structures 1 to 12

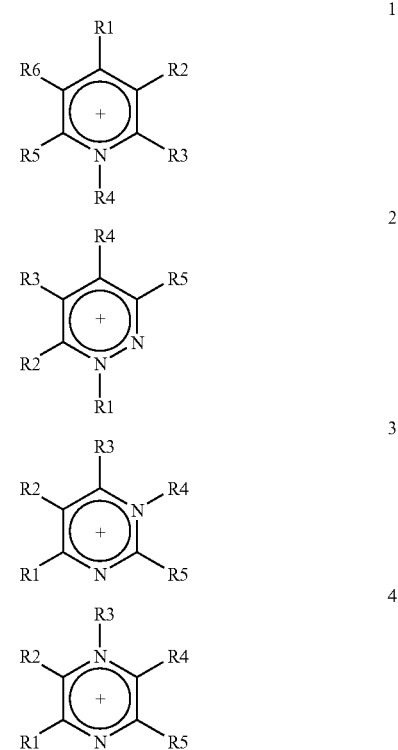

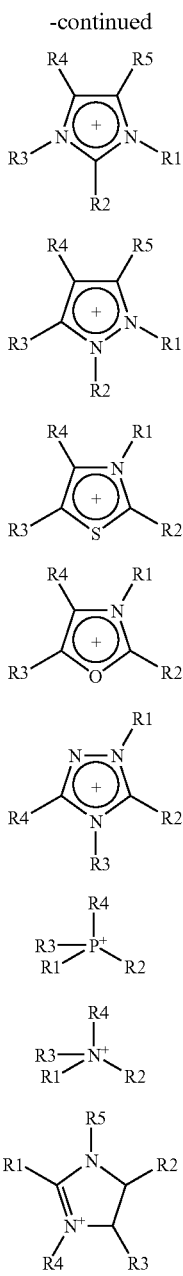

where R1, R2, R3, R4, R5, and R6 are identical or different and are hydrogen, a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms, a linear or branched aliphatic hydrocarbon radical having from 2 to 20 carbon atoms and having interruption by one or more heteroatoms (oxygen, NH, NCH₃), or are a linear or branched aliphatic hydrocarbon radical having from 2 to 20 carbon atoms and having interruption by one or more functionalities selected from the group —O—C(O)—, —(O)C—O—, NH—C(O)—, —(O)C—NH, —(CH₃)N—C(O)—, —(O)C—N(CH₃)—, —S(O)₂—O—, —O—S(O)₂—, —S(O)₂—NH—, —NH—S(O)₂—, —S(O)₂—N(CH₃)—, —N(CH₃)—S(O)₂—, or are a linear or branched aliphatic hydrocarbon radical having from 1 to 20 carbon atoms, terminally functionalized by —OH, —NH₂, or —N(H)CH₃, or are a polyether of formula —(R⁷—O)ₙ—R⁸ having block or random structure, where R⁷ is a linear or branched hydrocarbon radical having from 2 to 4 carbon atoms, n=from 1 to 30, and R⁸ is hydrogen, a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms, or a —C(O)—R⁹ radical, where R⁹ is a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms; and having an anion selected from the group consisting of halides, i.e. chloride, bromide, and iodide, preferably iodide, phosphate, halophosphates, preferably hexafluorophosphate, alkylated phosphates, nitrate, sulfate, hydrogen-sulfate, alkyl sulfates, preferably octyl sulfate, aryl sulfates, perfluorinated alkyl sulfates, perfluorinated aryl sulfates, sulfonate, alkylsulfonates, arylsulfonates, perfluorinated alkyl- and arylsulfonates, preferably triflate, perchlorate, tetrachloroaluminate, tetrafluoroborate, alkylated borates, preferably B(C₂H₅)₃C₆H₁₃⁻, tosylate, saccharinate, alkyl carboxylates, and bis(perfluoroalkylsulfonyl)amide anions, preferably the bis(trifluoromethylsulfonyl)amide anion; or is a mixture of two or more of these salts.

In one preferred embodiment of the polymer composition of the invention, the ionic liquid has halogen-free anions selected from the group consisting of phosphate, alkyl phosphates, nitrate, sulfate, alkyl sulfates, aryl sulfates, sulfonate, alkylsulfonates, arylsulfonates, alkyl borates, tosylate, saccharinate, and alkyl carboxylates, particular preference being given to alkyl sulfates, in particular octyl sulfate, and to tosylate.

In another preferred embodiment of the polymer composition of the invention, the ionic liquid has various anions and/or cations. The ionic liquids used by way of example as plasticizers may therefore be used individually or in a mixture in the polymer composition of the invention.

The ionic liquid is prepared as described in the literature, inter alia in S. Saba, A. Brescia, M. Kaloustian, Tetrahedron Letters 32(38) (1991), 5031-5034, EP 1 072 654, and EP 1 178 106.

The polymer composition of the invention preferably comprises at least one thermoplastically processable polymer selected from the group of the (co)polyamides, (co)polyesters, polycarbonates, polyurethanes, polyphenylene ethers, polyolefins, (co)polyetheramides, polyaramides, polyether (ether)ketones, and polyetheresteramides.

In one particular embodiment of the polymer composition of the invention, it comprises at least one thermoplastically processable polymer from the group of the homopolyamides. Preference is given here to homopolyamides of the structure 13 or the structure 14, where n≧2, and also k≧2 (independently of one another), and m>3.

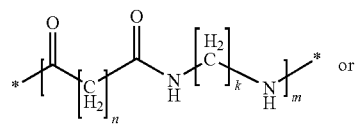

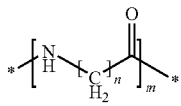

Examples of polymers of the structures 13 and 14 are nylon-4,6, nylon-6,6, nylon-6,9, nylon-6,12, nylon-10,12, nylon-12,12, nylon-6, nylon-11, and nylon-12.

In another embodiment of the polymer composition of the invention, this comprises aromatic polyamides based on aromatic dicarboxylic acids and/or on aromatic diamines, preference being given to aromatic polyamides based on terephthalic acid, e.g. nylon-6,3T, isophthalic acid, and naphthalenedicarboxylic acids. The polymer composition of the invention here preferably comprises a thermoplastically processable polymer of the following structures 15, 16, and 17, where x=from 2 to 22, and y=from 2 to 22:

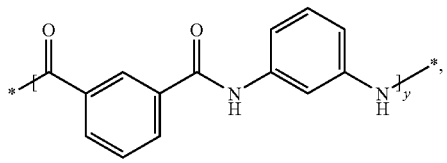

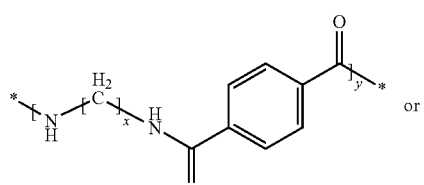

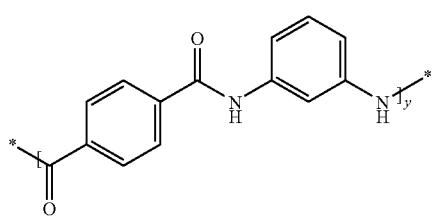

In one particularly preferred embodiment of the polymer composition of the invention, this comprises aliphatic polyamides and/or copolyamides. The polyamide-forming monomer present in the polyamides of the polymer composition of the invention preferably comprises lactams or T-aminocarboxylic acids, in each case having from 4 to 19, in particular from 6 to 12, carbon atoms. Particular preference is given to the use of γ-caprolactam, γ-aminocaproic acid, caprylolactam, T-aminocaprylic acid, laurolactam, T-aminododecanoic acid, and/or T-aminoundecanoic acid.

Examples of combinations of diamine and dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/didecanedioic acid, and dodecamethylenediamine/2,6-naphthalenedicarboxylic acid. Besides these, however, it is also possible to use any other combination, such as decamethylenediamine/dodecanedioic acid/terephthalic acid, hexamethylenediamine/adipic acid/terephthalic acid, hexamethylenediamine/adipic acid/caprolactam, deca-methylenediamine/dodecanedioic acid/T-aminoundecanoic acid, decamethylenediamine/dodecanedioic acid/laurolactam, decamethylenediamine/terephthalic acid/laurolactam, or dodecamethylenediamine/2,6-naphthalenedicarboxylic acid/laurolactam.

The polymer composition of the invention may comprise copolyamides as thermoplastically processable polymer. Those preferably suitable here contain underlying monomers which give the abovementioned homopolyamides. As co-component, use may be made of laurolactam, 11-aminoundecanoic acid, caprolactam, adipic acid/hexamethylenediamine, dodecanedioic acid/hexamethylenediamine, dodecanedioic acid/methylpentanediamine, dodecanedioic acid/decamethylenediamine, or dodecanedioic acid/isophoronediamine. These copolyamides are described by way of example in DE 39 21 164, DE 23 24 160, DE 19 39 758, and DE 32 48 776. The copolyamides listed may be used individually or in a mixture for the polymer composition of the invention. The homopolyamides and the copolyamides may be linear or branched.

The thermoplastically processable polymer present in the polymer composition of the invention may comprise homo- and/or copolyesters, e.g. polyalkylene terephthalates; in particular polyethylene terephthalate and polybutylene terephthalate, polybutylene naphthalate, polyethylene naphthalate, 1,4-cyclohexanedimethanol (co)polyesters, polycaprolactam, polyoxytetramethylene-b-polybutylene terephthalate, polylactides. These are preferably copolyesters of the structure 18:

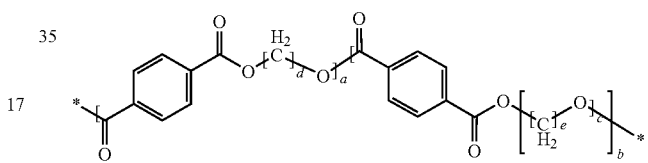

where d=from 2 to 6, e=from 2 to 4, a>20, b=from 0 to 40, c=from 1 to 40, and the structural units based on monomers each having two hydroxy groups may be linear or branched. Preference is given to copolyesters of the structure 19:

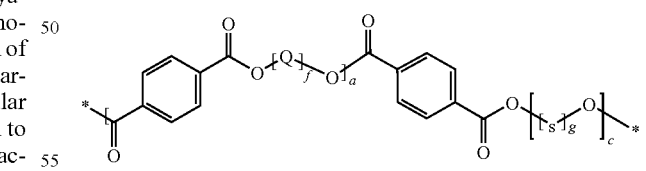

where g=from 1 to 5, f=from 1 to 5, and Q and S, independently of one another, may be bivalent radicals, e.g. of the structures 20, 21, 22 and 23:

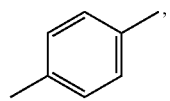

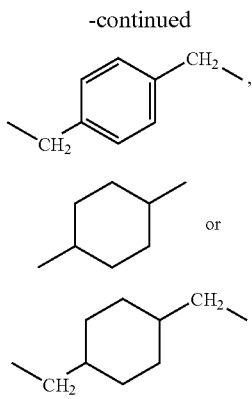

Particular preference is given to copolyesters produced from various hydroxycarboxylic acids and/or from lactones, of the structure 24:

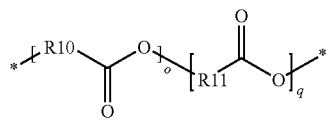

where both R10 and R11 are linear or branched alkyl radicals, o may preferably be >1, and q may preferably be <200, but o may preferably be >10 and q may preferably be <70.

Very particular preference is given to copolyesters of the structure 25:

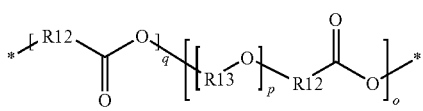

where R12 may be linear or branched alkyl radicals, and these may be either identical or different, R13 may be a hydrocarbon group having from 2 to 4 carbon atoms, e.g. —($CH_2$)$_2$—, —$CH_2$—CH($CH_3$)—, —($CH_2$)$_4$—, and p=from 1 to 40. In one particular embodiment, various lactones may be used as monomers.

A polymer composition of the invention may also preferably comprise thermoplastically processable polymers selected from the group of the polycarbonates, polyolefins, polyurethanes, these being thermoplastically processable, polyphenylene ether, as described in EP 0 657 519, copolyetheramides, and copolyetheresteramides.

In another embodiment, the polymer composition of the invention comprises at least one crosslinked, or at least one crosslinkable, polymer. The polymer composition of the invention preferably comprises at least one polymer selected from the group of the (co)polyamides, (co)polyesters, polycarbonates, polyurethanes, and polyphenylene ethers. This polymer composition of the invention permits preparation of a crosslinked plasticized polymer, using a non-volatile plasticizer, the ionic liquid.

The polymers present in the polymer composition of the invention may be linear or branched. The polymer compositions of the invention may comprise one or more polymers, in the form of either a polymer blend, copolymer, or physical mixture, and the polymer composition of the invention preferably comprises at least one polymer mixture or at least one polymer blend. The polymeric component may comprise additives, such as UV stabilizers, fillers, flame retardants, antioxidants. In one particular embodiment, the polymer composition of the invention may comprise modified, e.g. end-group-modified, polymers.

When compared with a polymer with no ionic liquid present, the glass transition temperature, measured by differential scanning calorimetry (DSC), of the polymer composition of the invention is preferably lower by 18K.

When compared with the polymer without the presence of the ionic liquid, the polymer composition of the invention, which comprises a crystalline or semicrystalline polymer, has higher recrystallization capability, measured via onset of recrystallization from the polymer melt at a higher temperature in a DSC cooling test.

These morphological properties can improve the processing properties, in particular thermoplastic processing properties, of the polymer composition of the invention, when compared with a polymer composition with no ionic liquid. This is apparent, for example, in that the polymer composition of the invention can be molded at lower temperatures without any breakdown of the polymer chain, or in that the shaping process can take place at higher temperatures without volatility of the plasticizer—the ionic liquid.

The polymer composition of the invention may also have microbicidal properties. These polymer compositions of the invention with microbicidal properties preferably comprise an ionic liquid having a quaternary ammonium ion, but particularly preferably TEGOTAIN® 3300, which has intrinsic microbicidal properties. In one particular embodiment of the polymer composition of the invention, at least one of the polymers used may itself have microbicidal properties. Polymers which have microbicidal properties are described, inter alia, in DE 199 52 221, DE 199 43 344, or DE 199 40 023.

The polymer composition of the invention may moreover also have antistatic properties. The antistatic properties may either be a result of attachment of water molecules (increased water absorption), thus following the principle of the well-known improvement of the conductivity of polymeric materials via addition of salts, e.g. potassium formate, or may be brought about by ion-conductivity intrinsically attributable to the ionic liquids used.

In the process of the invention for preparing a polymer composition, which comprises at least one polymer having no ionic groups and comprises at least one compound with plasticizing properties, where the polymer composition comprises from 0.1 to 30% by weight of ionic liquid as plasticizer, in particular for preparing the polymer composition of the invention, the ionic liquid is first brought into contact with a polymeric component of the polymer composition, for example with at least one of the polymers, and then dispersed in the polymer composition. One of the components of the polymer composition of the invention here may be molten or solid or in solution in a solvent. If one of the components of the polymer composition of the invention is used in solution in a solvent, the solvent may then be removed from the precursor of the polymer composition of the invention, preferably by a thermal separation process, e.g. distillation, or by precipitation of the polymer composition of the invention, e.g via addition of a non-solvent, or via a temperature decrease.

In one particular embodiment of the process of the invention, the solvent or swelling agent, which in this instance is identical with the ionic liquid, may remain present in the polymer composition of the invention. This is particularly advantageous for multiphase polymer systems in which, for example, only one of the polymeric components is compatible with the ionic liquid. An additional result can be novel properties for the multiphase system, preferably at the phase boundaries. Another possible use of the polymer composition of the invention in which the ionic liquid remains present is the dissolving or solvating of one polymer component of a multiphase system, where another polymer component is incompatible with the simple ionic liquid. Through mixing or kneading of this multiphase system it is possible for the ionic liquid to migrate into the phase which is incompatible with the simple ionic liquid.

In one particular embodiment of the process of the invention, the dispersion of the ionic liquid in the polymer composition takes place by means of a mixing process. Here, the ionic liquid can be brought into contact with, and then thoroughly mixed with, the molten phase of the polymeric component. Another method consists in bringing the ionic liquid into contact with the solid phase of the polymeric component, then melting, and then thoroughly mixing. One way of achieving this is to use mechanical mixing of the polymeric component and the ionic liquid by means of an extruder or stirrer at appropriate temperatures, and preference is given to mixing of the individual components of the polymer composition of the invention in a single- or twin-screw kneader, the polymeric component being molten. It is also possible for the polymeric component to become dissolved in the ionic liquid at relatively high temperatures during the mixing process, or for both the polymeric component and the ionic liquid to be dissolved in a solvent. In one particular embodiment of this portion of the process, the polymeric component, which comprises precipitated, spray-dried, or (low-temperature-)milled polymer, for example, is mixed with the ionic liquid, where appropriate via addition of a solvent which can dissolve the ionic liquid but cannot dissolve the polymeric component, thus giving homogeneous dispersion of the ionic liquid in the polymer composition of the invention.

In another preferred embodiment of the process of the invention, the dispersion of the ionic liquid in the polymer composition takes place by means of diffusion. Preference is given here to impregnation of polymer powders by an ionic liquid, and particular preference is given to impregnation of films, fibers, foams, or injection moldings, using auxiliaries, e.g. solvent.

The polymer composition of the invention or the polymer composition prepared by processes of the invention may be used in a shaping process, for example. In the shaping process, a plastic which comprises a polymer composition of the invention or comprises a polymer composition prepared by processes of the invention, or which is itself the polymer composition of the invention, may be hot-molded by means of injection molding, extrusion or blow molding, for example. When thermoplastics are injection molded, good processability of the polymer materials is particularly important. When the polymers used have strongly polar groups, this processability can be limited by intra- and intermolecular interactions. Use of the polymer compositions of the invention or of the polymer composition prepared by the process of the invention, where these use ionic liquids as plasticizers, lowers the level of interactions between the functional groups bonded to the polymer, and thus improves processability.

The polymer composition of the invention or the polymer composition prepared by processes of the invention may also be used as a starting material in spinning processes. For polymers intended for spinning to give fibers, the spinning process can be rendered possible, or rendered easier, by the ionic liquid. The lowering of melt viscosity through the addition of ionic liquids can give greater processing latitude for the spinning process, and the same applies to film production and other extrusion processes.

The ionic liquids present as processing aids with plasticizing effect in the polymer compositions of the invention or in the polymer compositions prepared by the process of the invention may also, if they are miscible with water or with another solvent incompatible with the polymer, be extracted again from the polymers after processing, and this can alter the structure and properties of the polymer. This can open up new application sectors for specific types of polymer.

The invention also provides the use of the polymer composition of the invention, or of the polymer composition prepared by processes of the invention, for the production of unsupported films, supported films, sports shoes, or coatings, preferably in sports equipment or sports products, e.g. the coatings of snowboards, or membranes. Preference is given to the use of the polymer composition of the invention, or of the polymer composition prepared by processes of the invention, as hot-melt adhesive, adhesion promoter, binder, filler material, or packaging material. The use of the polymer composition of the invention, or of the polymer composition prepared by processes of the invention, as adhesion promoter is preferably employed in composite polymeric systems, e.g in multilayer pipes or compound systems. In displays or other electronic components, the polymer composition of the invention or the polymer composition prepared by processes of the invention may be used as binder, filler material, or as packaging material. The polymer composition of the invention, or the polymer composition prepared by processes of the invention, may be used in the production of membranes, preferably of ceramic membranes, and the result here can be an improvement in the separating action of the membrane.

The polymer composition of the invention, or the polymer composition prepared by processes of the invention, may be used as a constituent of a mixture of polymers which are immiscible or incompatible, in the form of a compatibilizer for the production of a polymer blend, preferably of homogeneous polymer blends.

In another use of the polymer composition of the invention, or of the polymer composition prepared by processes of the invention, this may be used as an agent modifying viscosity and/or conductivity in polymer mixtures or polymer compositions. The polymer composition of the invention, or the polymer composition prepared by processes of the invention, can be used here in the form of what is known as a masterbatch.

In these uses, the polymer composition of the invention, or the polymer composition prepared by processes of the invention, may be used directly, or in a mixture with other polymers.

The polymer composition of the invention, or the polymer composition prepared by processes of the invention, permits the production of novel binder systems and novel adhesive systems. The presence of ionic groups by virtue of the ionic liquid can improve the adhesion performance of the polymer composition of the invention, or of the polymer composition prepared by processes of the invention, on polar surfaces or on surfaces solvated by the ionic liquids.

The current prior art produces conductive binder systems and adhesives by adding specific conductivity fillers. Antistatic molding compositions, coatings, rubbers, and foams are produced either by incorporating conductivity-improving fillers or fibers, e.g. carbon black or graphite, or by incorporating low-molecular-weight salts, such as potassium formate. Electrically conductive adhesives have become established as an alternative or supplement to soft soldering, in particular in electronics. The underlying polymers used are mainly epoxy resins, but adhesive systems based on cyanoacrylate, on silicone, and on polyimide are also known. Gold, silver, copper, and nickel in lamellar or flake form are known as additives which raise conductivity, as are silver-coated glass beads, for example (EP 0 195 859).

In connection with the prior art for polymer materials rendered conductive for electronic applications, it should be noted that use can be made of material which raise the conductivity of a polymer blend, either via addition of intrinsically conductive polymer materials (e.g. $BF_4$-doped poly (ethoxythiophene)) as additive for hot-sealable antistatic films (DE 42 19 410), or using addition of conductive particles or fibers modified to be antistatic or conductive.

The introduction of the ionic groups into the polymer composition by means of the ionic liquids permits a wide range of adaptation of the electrical properties of the polymer compositions of the invention, or of the polymer compositions prepared by processes of the invention. This makes it possible to provide the polymer composition of the invention, or the polymer composition prepared by processes of the invention, with an antistatic property, or also in some cases a semiconductive property. The polymer composition of the invention, or the polymer composition prepared by processes of the invention, may therefore be used for (co)extrusion or injection molding processes as a semi-conductive or antistatic binder or adhesive in electrical or electronic components. It can be particularly advantageous to use the polymer composition of the invention, or the polymer composition prepared by processes of the invention, in electronic components, for example, since these systems have variable electrical and thermal properties.

The examples below are intended to provide more detailed illustration of the invention but not to limit its scope of protection:

EXAMPLE

Preparation of a Polymer Composition of the Invention 5 g of VESTAMELT, a hot-melt adhesive based on copolyamides from Degussa AG, and 15% by weight of ionic liquid, based on VESTAMELT (corresponding to 0.75 g of ionic liquid) in 25 g of acetone were intimately mixed in a shaker and then the acetone was removed on a rotary evaporator.

The ionic liquids used were:
1-ethyl-3-methylimidazolinium tosylate
trioctylammonium octyl sulfate
1,3-dimethylimidazolinium octyl sulfate
The VESTAMELT powders used were:
VESTAMELT VM 250-P2
VESTAMELT VM 430-P2
VESTAMELT VM 470-P830
The table below shows the lowering of melting point and glass transition temperature, and the simultaneous increase in enthalpies of fusion, in comparison with the original powders.

| VESTA-MELT | Ionic liquid | ΔTm (K) | ΔTg (K) | Δ(ΔH) (J/g) |
|---|---|---|---|---|
| VM250 | Trioctylammonium octyl sulfate | −4.8 | n.d. | 14.5 |
| VM430 | 1-Ethyl-3-methylimidazolinium tosylate | −5.4 | −14.3 | 16.3 |
| | Trioctylammonium octyl sulfate | −5.7 | −10.0 | 1.7 |
| | 1,3-dimethylimidazolinium octyl sulfate | −6.0 | −16.6 | 11.5 |
| VM470 | 1-Ethyl-3-methylimidazolinium tosylate | −4.0 | −14.9 | 10.3 |
| | 1,3-Dimethylimidazolinium octyl sulfate | −4.5 | −18.0 | 13.6 |

The use of ionic liquids as plasticizer lowers melting point and glass transition temperature, and thus improves thermoplastic processability.

What is claimed is:

1. A polymer composition, which comprises a polymer component comprising at least one at least semicrystalline polymer having no ionic groups, and 0.1 to 30% by weight of at least one ionic liquid, as plasticizer, wherein the semicrystalline polymer is a thermoplastically processable polymer selected from the group consisting of (co)polyamides, (co)polyesters, polyurethanes, polyphenylene ethers, polyolefins, (co)polyetheramides, polyaramides, polyether(ether)ketones, and polyetheresteramides, and the ionic liquid is a salt having a cation of the following structures:

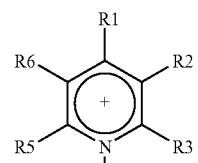
1

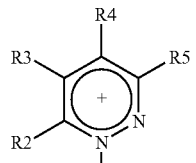
2

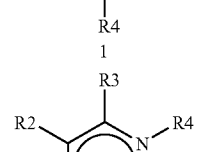
3

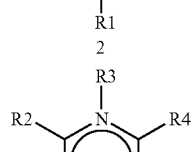
4

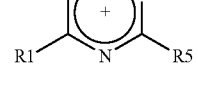
5

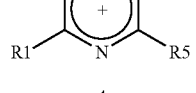
6

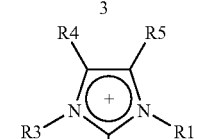
7

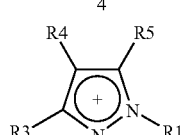
8

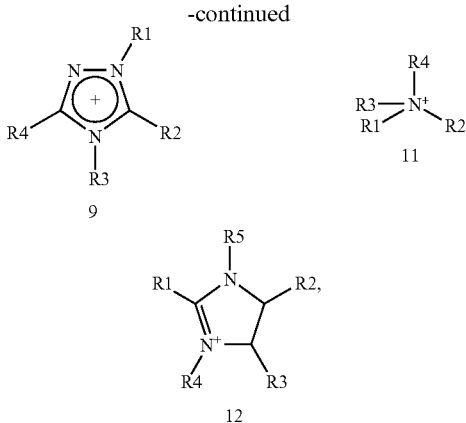

where R1, R2, R3, R4, R5, and R6 are identical or different, and are hydrogen, a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms, a linear or branched aliphatic hydrocarbon radical having from 2 to 20 carbon atoms and having interruption by one or more heteroatoms (oxygen, NH, NCH$_3$), or are a linear or branched aliphatic hydrocarbon radical having from 2 to 20 carbon atoms and having interruption by one or more functionalities, selected from the group —O—C(O)—, —(O)C—O—, NH—C(O)—, —(O)C—NH, —(CH$_3$)N—C(O)—, —(O)C—N(CH$_3$)—, —S(O)$_2$—O—, —O—S(O)$_2$—, —S(O)$_2$—NH—, —NH—S(O)$_2$—, —S(O)$_2$—N(CH$_3$)—, —N(CH$_3$)—S(O)$_2$—, or are a linear or branched aliphatic hydrocarbon radical having from 1 to 20 carbon atoms, terminally functionalized by —OH, —NH$_2$, or —N(H)CH$_3$, or are a polyether of formula —(R$^7$—O)$_n$—R$^8$, having block or random structure, where R$^7$ is a linear or branched hydrocarbon radical having from 2 to 4 carbon atoms, n=from 1 to 30, and R$^8$ is hydrogen, a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms, or a —C(O)—R$^9$ radical, where R$^9$ is a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms; and having an anion selected from the group consisting of halide, phosphate, halophosphates, alkylated phosphates, nitrate, sulfate, hydrogensulfate, alkyl sulfates, aryl sulfates, perfluorinated alkyl sulfates, perfluorinated aryl sulfates, sulfonate, alkylsulfonates, arylsulfonates, perfluorinated alkyl- and arylsulfonates, perchlorate, tetrachloroaluminate, tetrafluoroborate, alkylated borates, tosylate, saccharinate, alkyl carboxylates, and bis(perfluoroalkylsulfonyl)amide anions.

2. The polymer composition as claimed in claim 1, which comprises 0.5 to 25% by weight of ionic liquid.

3. The polymer composition as claimed in claim 1, wherein the at least semicrystalline polymer comprises at least one crosslinked, or at least one crosslinkable, polymer selected from the group consisting of (co)polyamides, (co)polyesters, polyurethanes, and polyphenylene ethers.

4. The polymer composition as claimed in claim 1, wherein the polymer is linear or branched.

5. The polymer composition as claimed in claim 1, which comprises at least one mixture of said at least semicrystalline polymer.

6. The polymer composition as claimed in claim 1, wherein the ionic liquid contains a halogen-free anion, selected from the group consisting of phosphate, alkyl phosphates, nitrate, sulfate, alkyl sulfates, aryl sulfates, sulfonate, alkylsulfonates, arylsulfonates, alkyl borates, tosylate, saccharinate, and alkyl carboxylates.

7. The polymer composition as claimed in claim 1, wherein the ionic liquid of the polymer composition comprises more than one anion.

8. The polymer composition as claimed in claim 1, which has microbicidal properties.

9. The polymer composition as claimed in claim 1, which has antistatic properties.

10. The polymer composition as claimed in claim 1, which has a glass transition temperature, measured by differential scanning calorimetry (DSC), which is lower by up to 18K, than that of the polymer component.

11. A process for preparing the polymer composition as claimed in claim 1,
said process comprising
first bringing said ionic liquid into contact with said polymeric component of the polymer composition, and then dispersing the ionic liquid in the polymer composition.

12. The process as claimed in claim 11, wherein the dispersion of the ionic liquid in the polymer composition takes place by means of a mixing process.

13. The process as claimed in claim 11, wherein the ionic liquid is brought into contact with, and thoroughly mixed with, a molten phase of the polymeric component.

14. The process as claimed in claim 13, wherein the mixing of the components of the polymer composition is carried out in a single- or twin-screw kneader, the polymeric component being molten.

15. The process as claimed in claim 11, wherein the ionic liquid is brought into contact with a solid phase of the polymeric component, and thoroughly mixed after melting.

16. The process as claimed in claim 11, wherein the dispersion of the ionic liquid in the polymer composition takes place by means of diffusion.

17. The process as claimed in claim 16, wherein the preparation takes place by means of impregnation of polymer powders by an ionic liquid.

18. The process as claimed in claim 11, wherein at least one polymer and/or one ionic liquid is dissolved in a solvent.

19. The process as claimed in claim 18, wherein the solvent is removed by a thermal separation process from a precursor of the polymer composition.

20. The process as claimed in claim 18, wherein the solvent is removed from a precursor of the polymer composition by precipitation of the polymer composition.

21. A process for preparing a hot-melt adhesive, an adhesion promoter, a binder, a filler material, a packaging material, a compatibilizer for preparing polymer blends, an agent modifying viscosity and/or solubility in polymer mixtures or polymer compositions, an unsupported film, a supported film, a coating, a membrane, or a molding, where shaping takes place by means of injection molding, extrusion, or blow molding, said process comprising contacting the polymer composition of claim 1 with one or more additives.

22. The polymer composition as claimed in claim 1, wherein the polymer comprises a homopolyamide.

23. The polymer composition as claimed in claim 1, wherein the polymer comprises an aromatic polyamide.

24. The polymer composition as claimed in claim 1, wherein the polymer comprises an aliphatic polyamide and/or copolyamide.

25. The polymer composition as claimed in claim 1, wherein the polymer comprises a homo- and/or copolyester.

26. The polymer composition as claimed in claim 1, wherein the polymer comprises a copolyester produced from a hydroxycarboxylic acid and/or from a lactone.

27. A polymer composition, which comprises a polymer component comprising at least one at least semicrystalline polymer having no ionic groups, and 0.1 to 30% by weight of at least one ionic liquid, as plasticizer, wherein the semicrystalline polymer is a thermoplastically processable polymer selected from the group consisting of (co)polyamides, (co)polyesters, polyurethanes, polyphenylene ethers, polyolefins, (co)polyetheramides, polyaramides, and polyetheresteramides, and the ionic liquid is a salt having a cation of the following structures:

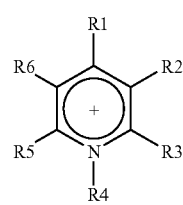

1

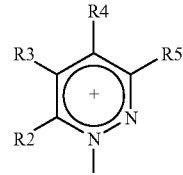

2

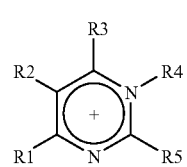

3

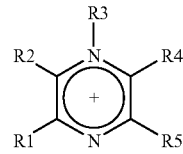

4

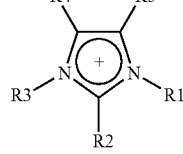

5

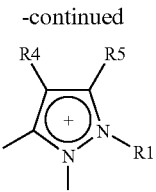

6

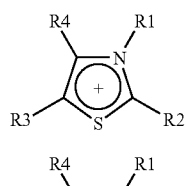

7

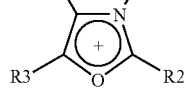

8

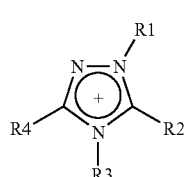

9

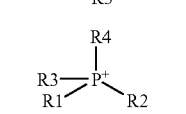

10

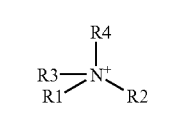

11

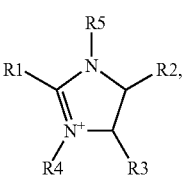

12 where R1, R2, R3, R4, R5, and R6 are identical or different, and are hydrogen, a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms, a linear or branched aliphatic hydrocarbon radical having from 2 to 20 carbon atoms and having interruption by one or more heteroatoms (oxygen, NH, NCH$_3$), or are a linear or branched aliphatic hydrocarbon radical having from 2 to 20 carbon atoms and having interruption by one or more functionalities, selected from the group —O—C(O)—, —(O)C—O—, NH—C(O)—, —(O)C—NH, —(CH$_3$)N—C(O)—, —(O)C—N(CH$_3$)—, —S(O)$_2$—O—, —O—S(O)$_2$—,
—S(O)$_2$—NH—, —NH—S(O)$_2$—, —S(O)$_2$—N(CH$_3$)—, —N(CH$_3$)—S(O)$_2$—or are a linear or branched aliphatic hydrocarbon radical having from 1 to 20 carbon atoms, terminally functionalized by —OH, —NH$_2$, or —N(H)CH$_3$, or are a polyether of formula —(R$^7$—O)$_n$—R$^8$, having block or random structure, where R$^7$ is a linear or branched hydrocarbon radical having from 2 to 4 carbon atoms, n=from 1 to 30, and $R^8$ is hydrogen, a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms, or a —C(O)—$R^9$ radical, where $R^9$ is a linear or branched aliphatic hydrocarbon radical having from 1 to 20 carbon atoms, a cycloaliphatic hydrocarbon radical having from 5 to 30 carbon atoms, an aromatic hydrocarbon radical having from 6 to 30 carbon atoms, an alkylaryl radical having from 7 to 40 carbon atoms; and having an anion selected from the group consisting of halide, phosphate, halophosphates, alkylated phosphates, nitrate, sulfate, hydrogensulfate, alkyl sulfates, aryl sulfates, perfluorinated alkyl sulfates, perfluorinated aryl sulfates, sulfonate, alkylsulfonates, arylsulfonates, perfluorinated alkyl- and arylsulfonates, perchlorate, tetrachloroaluminate, tetrafluoroborate, alkylated borates, tosylate, saccharinate, alkyl carboxylates, and bis(perfluoroalkylsulfonyl)amide anions.

\* \* \* \* \*